(12) United States Patent
Brahms et al.

(10) Patent No.: US 8,989,495 B2
(45) Date of Patent: Mar. 24, 2015

(54) CAPTURING METADATA ON SET USING A SMART PEN

(75) Inventors: Jason Brahms, Culver City, CA (US); Spencer Stephens, Culver City, CA (US)

(73) Assignees: Sony Corporation, Tokyo (JP); Sony Pictures Technologies Inc., Culver City, CA (US)

(*) Notice: Subject to any disclaimer, the term of this patent is extended or adjusted under 35 U.S.C. 154(b) by 0 days.

(21) Appl. No.: 13/541,521

(22) Filed: Jul. 3, 2012

(65) Prior Publication Data

US 2013/0222610 A1 Aug. 29, 2013

Related U.S. Application Data

(60) Provisional application No. 61/604,370, filed on Feb. 28, 2012.

(51) Int. Cl.
*G06K 9/18* (2006.01)
*G06F 3/0354* (2013.01)
*G06F 17/30* (2006.01)

(52) U.S. Cl.
CPC ........ *G06F 3/03545* (2013.01); *G06F 17/3082* (2013.01)
USPC ............ 382/186; 382/188; 382/305; 382/314

(58) Field of Classification Search
USPC ................... 348/207.1, 222.1; 358/1.18, 453; 382/186, 314
See application file for complete search history.

(56) References Cited

U.S. PATENT DOCUMENTS

| | | | |
|---|---|---|---|
| 7,111,230 B2* | 9/2006 | Euchner et al. | 715/232 |
| 8,006,189 B2 | 8/2011 | Dachs | |
| 8,115,948 B2* | 2/2012 | Rosenfeld et al. | 358/1.15 |
| 2009/0228126 A1 | 9/2009 | Spielberg et al. | |
| 2009/0251337 A1* | 10/2009 | Marggraff et al. | 341/20 |
| 2010/0033766 A1* | 2/2010 | Marggraff | 358/453 |
| 2011/0138417 A1 | 6/2011 | Klappert | |
| 2012/0005231 A1* | 1/2012 | Beckey et al. | 707/792 |
| 2012/0133989 A1* | 5/2012 | Glover | 358/1.18 |
| 2012/0275726 A1* | 11/2012 | Queck et al. | 382/314 |
| 2012/0282587 A1* | 11/2012 | Lofthus et al. | 434/335 |
| 2013/0222610 A1* | 8/2013 | Brahms et al. | 348/207.1 |

* cited by examiner

*Primary Examiner* — Gregory M Desire
(74) *Attorney, Agent, or Firm* — Procopio, Cory, Hargreaves & Savitch LLP

(57) ABSTRACT

Capturing metadata, including: a data capture device, wherein the data capture device captures notes made by a user and stores the notes as captured data; a data ingest computer, including a connection interface to connect to the data capture device and receive the captured data from the data capture device, and a data conversion component to convert the captured data to formatted data; and a data repository, connected to the data ingest computer, wherein the data repository is connected to a network. Keywords include smart pen and on set metadata acquisition.

16 Claims, 4 Drawing Sheets

CAPTURING METADATA ON SET USING A SMART PEN

CROSS-REFERENCE TO RELATED APPLICATIONS

This application claims the benefit of priority under 35 U.S.C. §119(e) of U.S. Provisional Patent Application No. 61/604,370, filed Feb. 28, 2012, entitled "Capturing Metadata On Set Using a Smart Pen". The disclosure of the above-referenced application is incorporated herein by reference.

BACKGROUND

1. Field of the Invention

The present invention relates to a technique for capturing metadata, and more specifically, to capturing metadata on set using a smart pen.

2. Background

Capturing metadata on a set during production to be used downstream in post-production and distribution is a challenging task due to many antiquated activities that are historically part of the film and television production process. Over the years, technology has had an impact in areas like digital acquisition (new cameras and digital formats), visual effects, and downstream in postproduction. Despite all of these innovations, the majority of the data captured on the set is still typically in paper form, stored in disparate locations and not readily accessible to various stakeholders who could use it.

SUMMARY

The present invention provides for capturing metadata.

In one implementation, a system for capturing metadata is disclosed. The system includes: a data capture device, wherein the data capture device captures notes made by a user and stores the notes as captured data; a data ingest computer, including a connection interface to connect to the data capture device and receive the captured data from the data capture device, and a data conversion component to convert the captured data to formatted data; and a data repository, connected to the data ingest computer, wherein the data repository is connected to a network.

In another implementation, a method for capturing metadata is disclosed. The method includes: registering a document; capturing notes made for the document using a data capture device as captured data; ingesting the captured data, including creating formatted data from the captured data; synchronizing the formatted data with a media file, including creating synchronized data; delivering the formatted data to a data repository.

In yet another implementation, a non-transitory storage medium storing a computer program to capture metadata is disclosed. The computer program includes executable instructions that cause a computer to: register a document; capture notes made for the document using a data capture device as captured data; ingest the captured data, including creating formatted data from the captured data; synchronize the formatted data with a media file, including creating synchronized data; deliver the formatted data to a data repository.

Other features and advantages of the present invention will become more readily apparent to those of ordinary skill in the art after reviewing the following detailed description and accompanying drawings.

DETAILED DESCRIPTION

Certain implementations as disclosed herein provide for capturing metadata. In one implementation, smart pen and paper are used to capture and store notes hand written by a script supervisor during production of a movie. The data captured by the pen is stored in a networked data store that can then be accessed by other participants in the production process. After reading this description it will become apparent how to implement the invention in various implementations and applications. Although various implementations of the present invention will be described herein, it is understood that these implementations are presented by way of example only, and not limitation. As such, this detailed description of various implementations should not be construed to limit the scope or breadth of the present invention.

In a typical movie or television production environment, the script supervisor is the person who records information about the production and adjustments as the production occurs. The script supervisor makes hand written notes on a paper copy of the script (or other papers) and uses these for several purposes during production and post-production, including continuity, director's notes, slating, script updates, maintaining the lined script, production reports, and editor notes.

Although it is considered a technical versus artistic role, the script supervisor is an integral part of the creative process. It is for that very reason that new ideas and technical solutions have not been widely adopted. The fear was that these new methods will have an adverse effect on the creative process. Accordingly, the majority of script notes are still hand written on printed versions of the screenplay. The notes are then copied and sent to the editorial group as a reference to complement the editing process. Once that process is complete, on set data is filed away, usually in a place that is not readily accessible to other stakeholders.

In one implementation, a smart pen is used to digitally capture the script supervisor's hand written notes during production as data and store the data in a networked data storage accessible to many users. This maintains the flow and human interaction of production, but improves the capturing and transferring of the production data.

Figure 1:
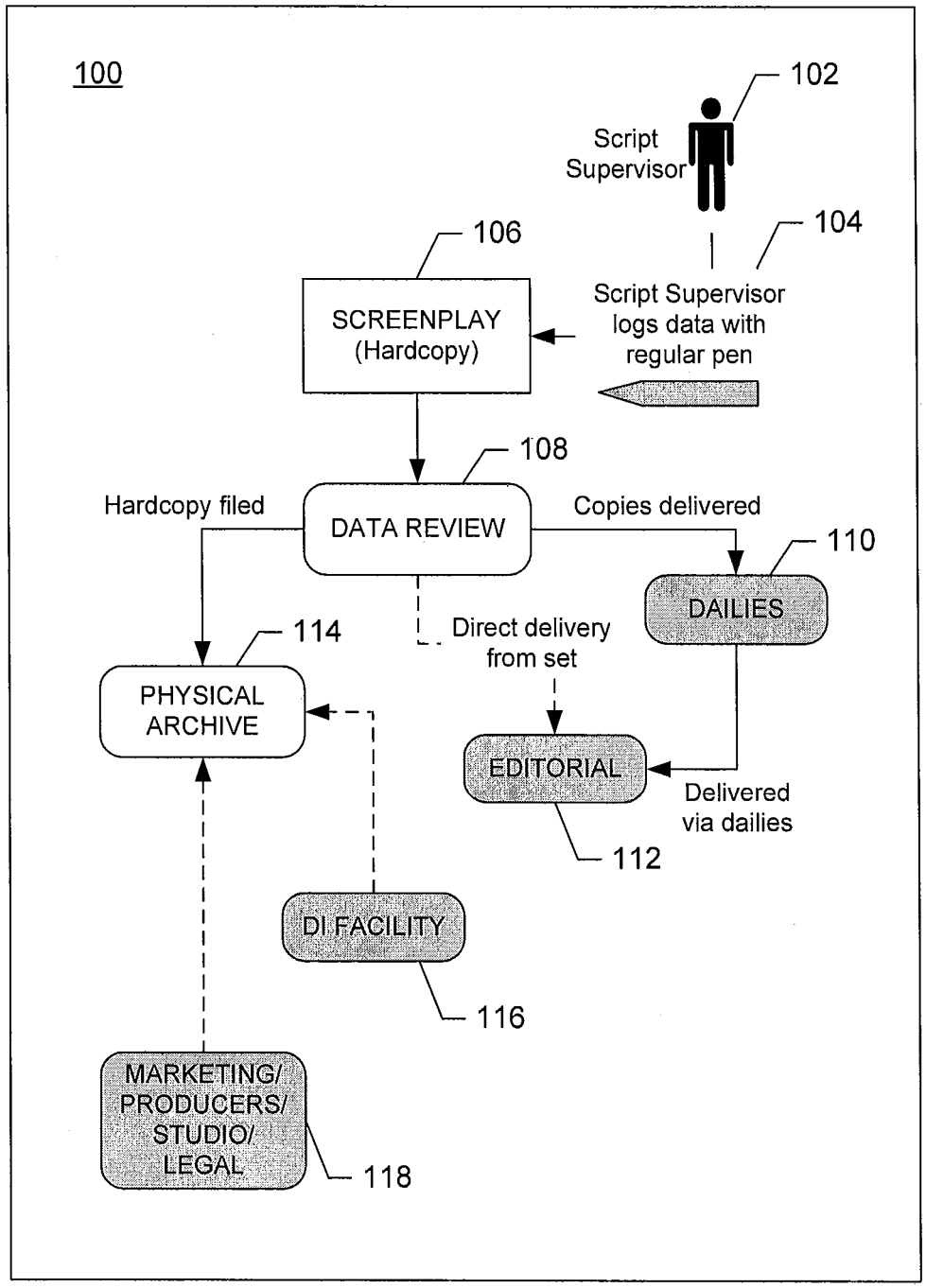
FIG. 1 shows a conventional process for a script supervisor to make notes during production and distribute those notes.

FIG. 1 shows a conventional process 100 for a script supervisor 102 to make notes during production and distribute those notes. A script supervisor (person) 102 uses a typical pen or pencil 104 to make hand written notes on a paper copy of a screenplay or script 106 during production of a movie or television program. The script supervisor checks the notes, editing if necessary, and makes copies (see block 108). One set of copies are delivered to the dailies team 110 and another set of copies to editorial 112. The dailies are then delivered to the editorial. Another hard copy (or the original) is stored for reference in a physical archive 114. The digital intermediate (DI) facility 116 and other business units 118 (e.g., marketing, producers, studio management, legal) may have reasons to also want to see the notes, but typically would need to make specific additional requests to have copies made and delivered.

Figure 2:
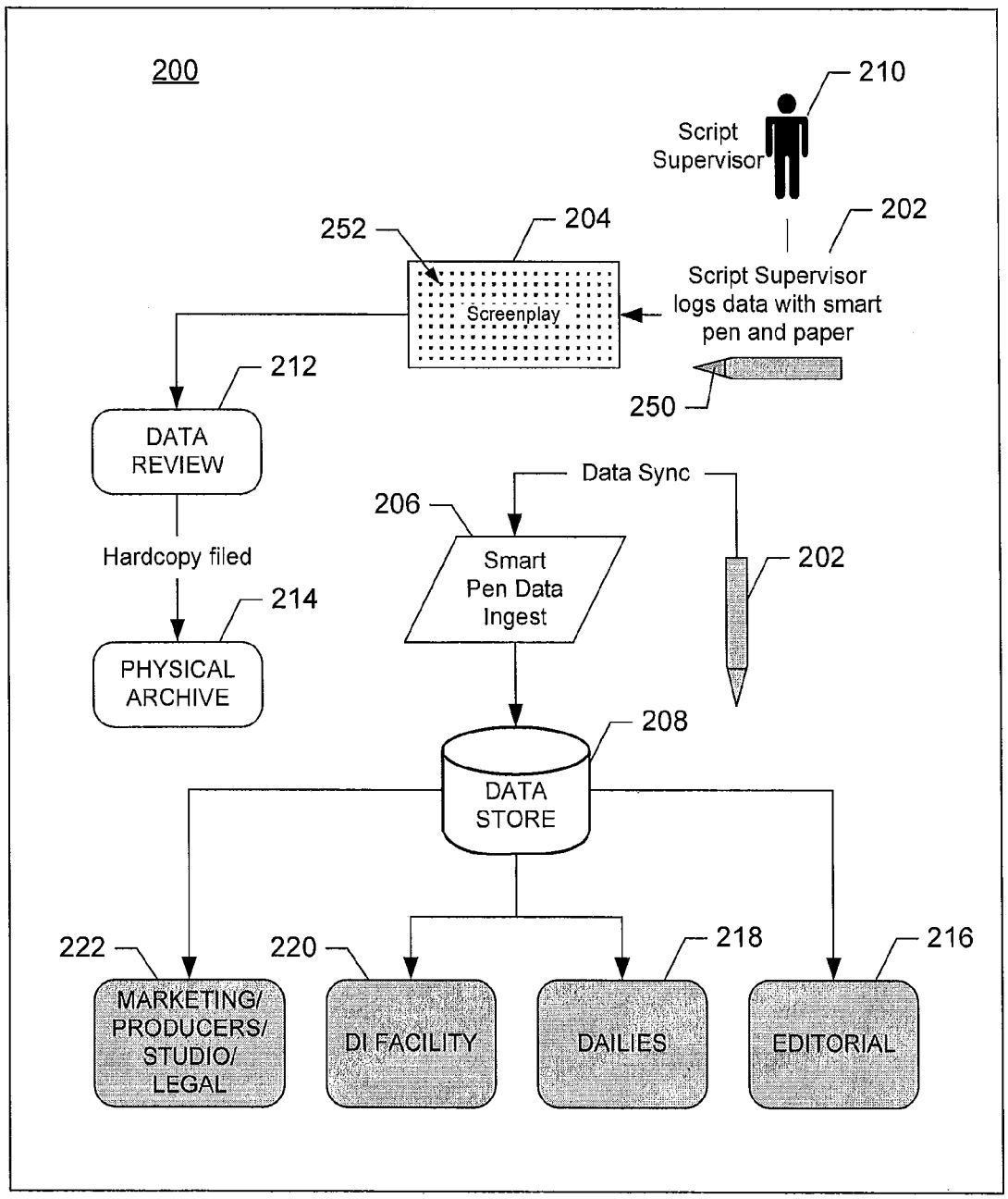
FIG. 2 is a functional block diagram of one implementation of a new system and process for on set data acquisition.

FIG. 2 is a functional block diagram of one implementation of a new system and process 200 for on set data acquisition. The system includes a smart pen 202, smart paper 204, data acquisition client software 206, and a data repository 208. A script supervisor (person) 210 uses the smart pen 202 to make hand written notes on a copy of a screenplay or script printed on smart paper 204 during production of a movie or television program. In one implementation, when the script supervisor 210 is writing, the smart pen 202 records the script supervisor's pen strokes using an image sensor 250 to track the microdots 252 on the smart paper 204, as discussed above, storing the notes as captured data. The script supervisor 210 checks the notes, editing if necessary (see block 212), and stores the paper original 204 (or a copy) for reference in a physical archive 214. In other implementations, the smart paper 204 may also include special controls printed on each page which allows the user to better navigate the pen's features and applications.

In another implementation, the smart pen 202 may include movement sensor(s) (e.g., accelerometer, gyroscope, level, compass, etc.) in place of the image sensor 250. Further, the smart paper 204 may include special controls and/or markers to aid the movement sensor(s) in accurately detecting the hand movement of the script supervisor 210.

The script supervisor 210 (or another user) connects (using wire or wirelessly through a connection interface) the smart pen 202 to a computer storing the data acquisition client software 206. The data acquisition client software 206 transfers the captured data from the smart pen 202 to a data repository 208. In one implementation, the data repository may be connected to a network. The data acquisition client software 206 also converts the data to formatted data in a format suitable for review and associates the data with related information (e.g., the screenplay). For example, in one implementation, the data acquisition client software 206 stores blocks of text or drawings with page numbers and line numbers based on the position of the notes and with timestamps based on the time of capture. The data is then converted and transferred to the networked data repository 208, such as a database connected to a production network.

In one implementation, the data repository 208 also stores a digital copy of the screenplay, such as an optical scan or a formatted text document. The data repository 208 may also store media files, such as video captured during production. The stored notes data, the screenplay copy, and the media files can be linked, cross-referenced, and delivered together or separately to requesting users. The data repository 208 is connected to a network so that the other participants in production, post-production, and business can access the notes, such as editorial 216, dailies 218, DI facility 220, and business 222 (e.g., marketing, producers, studio management, legal). In this system, the script supervisor's notes are stored as cross-referenced digital metadata in a network resource, allowing multiple users to easily access the metadata as needed.

Figure 3:
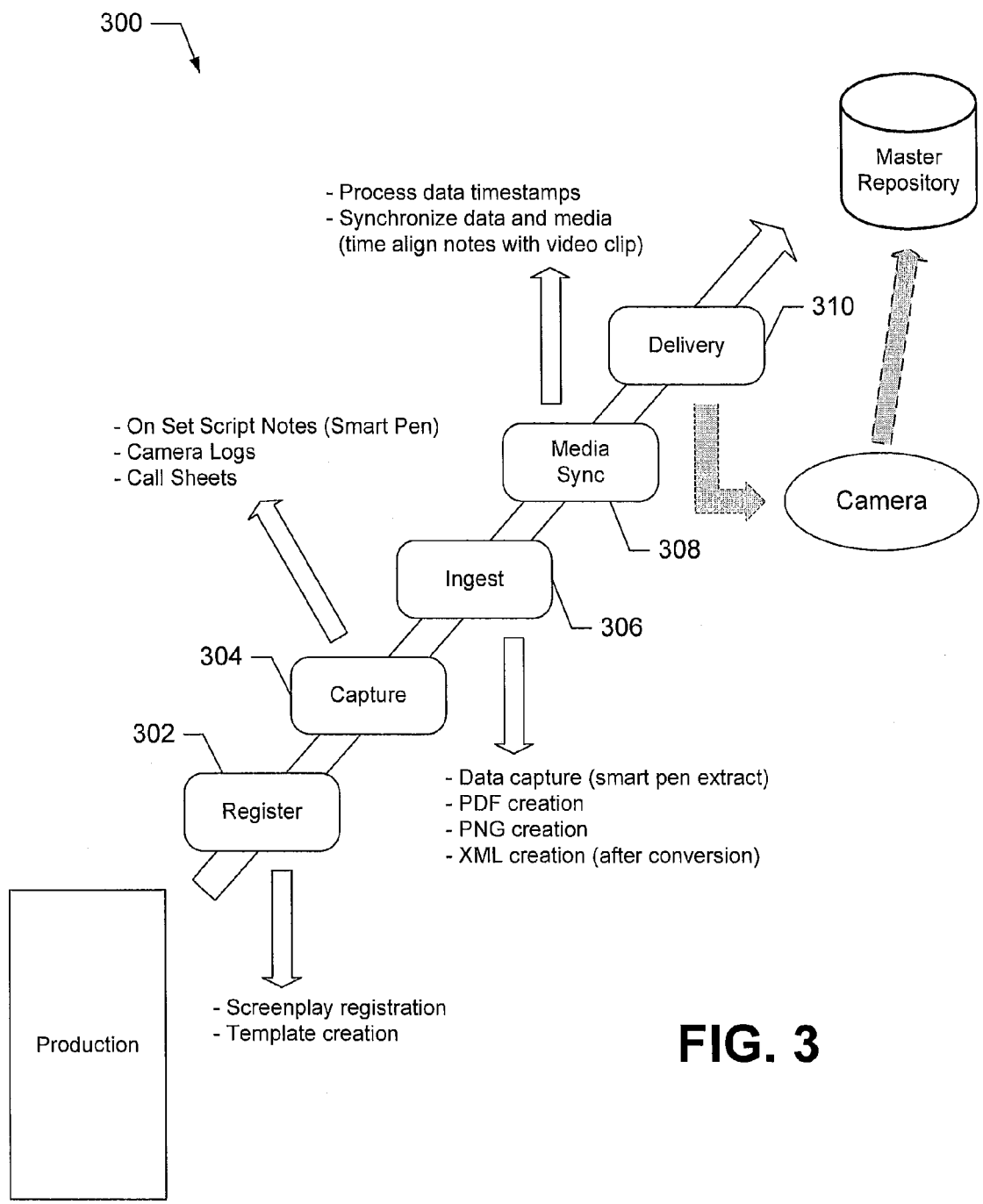
FIG. 3 shows a flowchart of one implementation of an acquisition process for acquiring metadata on set, and converting and storing the data.

FIG. 3 shows a flowchart 300 of one implementation of an acquisition process for acquiring metadata on set, and converting and storing the data. Initially, the screenplay is registered, at block 302. The registration step 302 can involve various operations required to kick off and manage an ongoing project. Examples of registration include ingesting of script (or screenplay) in PDF or Final Draft Format (FDX), registering the script, linking the script to the smart paper on which the script is printed on, version controlling required for re-writes/changes, and template creation. The notes are captured using a smart pen, at block 304. The capture step 304 revolves around smart pen usage and can include starting and stopping the capture of data, template driven capturing, shortcuts and/or custom coding, camera logs, and call sheets.

The captured data is then ingested, at block 306, from the smart pen into a client side application. This step 306 can include processes such as output creation (PDF, PNG, XML), data conversion (handwriting detection/conversion to structured data), data formatting, and data Timestamp extraction. The ingested data is synchronized with media files, at block 308, which synchronizes the "on set" data with rich media files (raw and/or dailies footage) to create synchronized data (in addition to the formatted data). Thus, this step 308 can include processes such as processing data timestamps, time alignment—data to file (e.g., aligning notes to video clip), data multiplexing (muxed/timed data into file header), data reformatting—new time aligned data and/or rich media converted into final deliverable package. Finally, the data is delivered, at block 310, into the master repository (e.g., networked database). The data can be delivered a variety of ways including being synchronized back to raw files on a capture device (e.g., camera or audio recorder) and being directly ingested into the data repository.

Figure 4A:
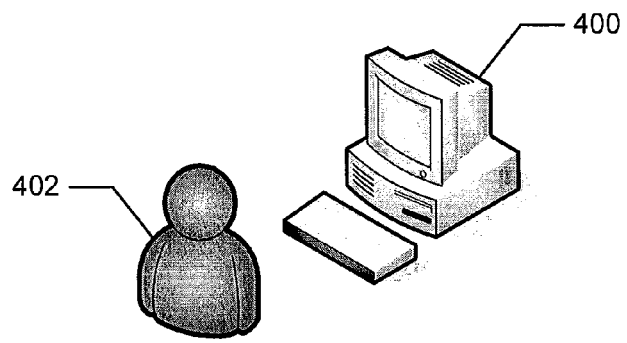
FIG. 4A illustrates a representation of a computer system and a user.

FIG. 4A illustrates a representation of a computer system 400 and a user 402. The user 402 uses the computer system 400 to perform various operations described with respect to FIGS. 2 and 3. Thus, the computer system 400 includes an on set metadata acquisition unit 490.

Figure 4B:
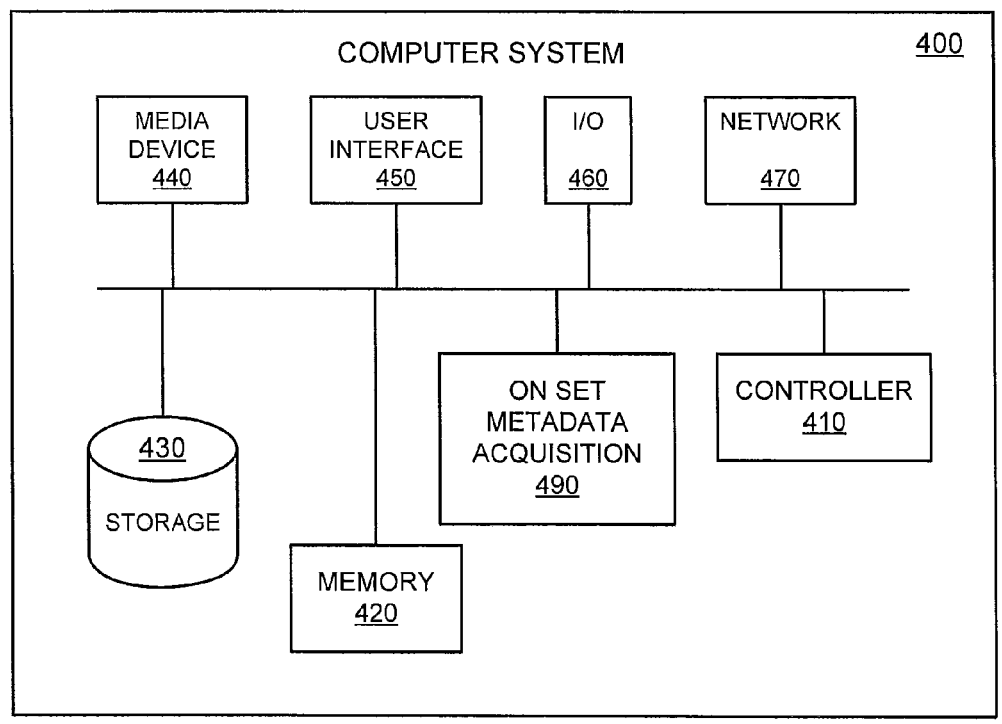
FIG. 4B is a functional block diagram illustrating the computer system hosting the on set metadata acquisition unit.

FIG. 4B is a functional block diagram illustrating the computer system 400 hosting the on set metadata acquisition unit 490. The controller 410 is a programmable processor and controls the operation of the computer system 400 and its components. The controller 410 loads instructions (e.g., in the form of a computer program) from the memory 420 or an embedded controller memory (not shown) and executes these instructions to control the system. In its execution, the controller 410 provides the on set metadata acquisition unit 490 as a software system. Alternatively, this service can be implemented as separate hardware components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Non-transitory storage 430 stores data for use by other components of the computer system 400, such as for storing data used by the on set metadata acquisition unit 490. In one implementation, storage 430 is a hard disk drive.

The media device 440 receives removable media and reads and/or writes data to the inserted media. In one implementation, for example, the media device 440 is an optical disc drive.

The user interface 450 includes components for accepting user input from the user 402 and presenting information to the user 402. In one implementation, the user interface 450 includes a keyboard, a mouse, audio speakers, and a display. The controller 410 uses input from the user 402 to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 802.11) supporting an Ethernet connection.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration).

In summary, the features provided in the above-described implementations can include, but are not limited to, one or more of the following items: (1) Minimal impact on the conventional process/industry-wide standard operating procedure for a script supervisor; (2) Data is captured, converted, and saved in original and structured form; (3) Smart pen data is captured in digital form while maintaining the status quo (can be compatible with many standard operating procedures); (4) Smart pen data time is aligned to the media allowing editors and others the ability to see the notes against the timeline of each clip; (5) Smart pen data available on demand to a variety of users (from production through distribution); (6) Smart Pen data promotes data integrity, improved efficiency, and increased quality in output/product.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Accordingly, additional implementations and variations are also within the scope of the invention. For example, a smart pen is not the only solution for capturing the on set data. Writing with a stylus (or finger) on an electronic tablet or touch screen computer can also be used. Typed notes, voice notes, or images or video could also be added. Similarly, optically scanning the handwritten notes and converting to data using optical character recognition (OCR) could also work. Further, it is to be understood that the description and drawings presented herein are representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

The invention claimed is:

1. A system for capturing metadata, comprising:
 a data capture device, wherein the data capture device captures on set notes including notes on script, editorials, and dailies made by a user during production of a movie or television show and stores the on set notes as captured data;
 a data ingest computer, including a connection interface to connect to the data capture device and receive the captured data from the data capture device, and a data conversion component to convert the captured data to formatted data; and
 a data repository, connected to the data ingest computer, wherein the data repository is connected to a network.

2. The system of claim 1, wherein the data capture device is a smart pen.

3. The system of claim 2, wherein the smart pen includes an optical sensor.

4. The system of claim 1, further comprising
 at least one sensor including at least one of accelerometers and gyroscopes to sense movement of the data capture device.

5. A method for capturing metadata, comprising:
 registering a document including script, editorials, and dailies made during production of a movie or television show;
 capturing on set notes including notes made on the document using a data capture device as captured data;
 ingesting the captured data into a data ingest computer to generate formatted data from the captured data;
 synchronizing the formatted data with a media file to generate synchronized data;
 delivering the formatted data to a data repository connected to the data ingest computer,
 wherein the data repository is connected to a network.

6. The method of claim 5, wherein the document is a screenplay.

7. The method of claim 5, wherein the data capture device is a smart pen.

8. The method of claim 5, wherein the media file is a video clip.

9. The method of claim 5, further comprising delivering the synchronized data to the data repository.

10. The method of claim 5, further comprising delivering the synchronized data to a camera.

11. The method of claim 5, wherein synchronizing the formatted data with a media file comprises: processing data timestamps; aligning the timestamps; data multiplexing; and data reformatting.

12. The method of claim 11, wherein aligning the timestamps comprises
 aligning the captured on set notes to the media file.

13. The method of claim 12, wherein data multiplexing comprises
 incorporating the aligned on set notes and the timestamps into a header of the document.

14. A non-transitory storage medium storing a computer program to capture metadata, the computer program comprising executable instructions that cause a computer to:
 register a document including script, editorials, and dailies made during production of a movie or television show;
 capture on set notes made on the document using a data capture device as captured data;
 ingest the captured data into a data ingest computer to generate formatted data from the captured data;
 synchronize the formatted data with a media file to generate synchronized data;
 deliver the formatted data to a data repository connected to the data ingest computer,
 wherein the data repository is connected to a network.

15. The non-transitory storage medium of claim 14, further comprising executable instructions that cause a computer to deliver the synchronized data to the data repository.

16. The non-transitory storage medium of claim 14, further comprising executable instructions that cause a computer to delivering the synchronized data to a camera.

* * * * *